Patented Feb. 18, 1936

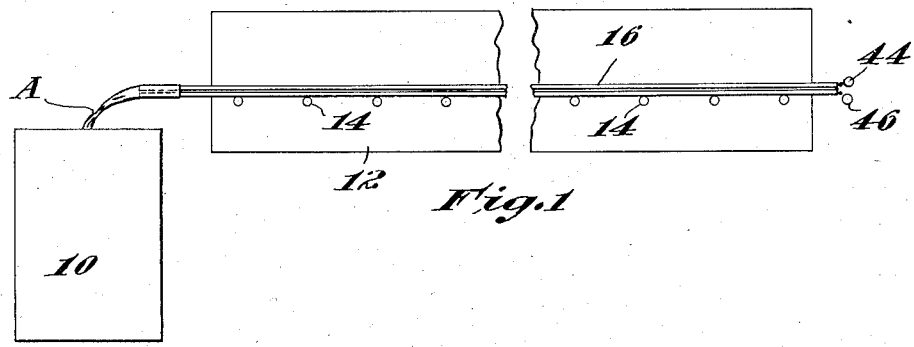
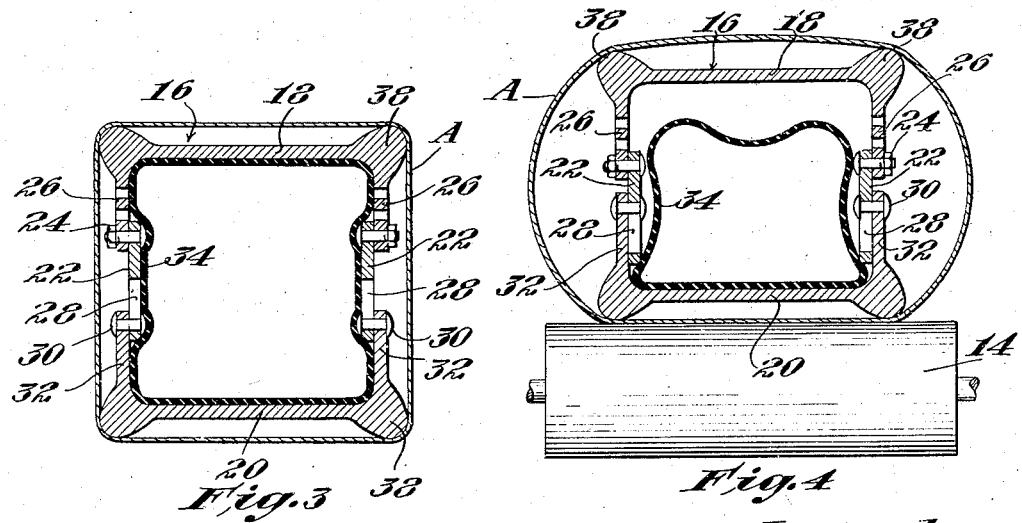

2,030,843

UNITED STATES PATENT OFFICE 2,030,843

PROCESS AND APPARATUS FOR TREATING SAUSAGE CASINGS

Ralph L. Atkinson, Dorchester, Mass., assignor to Arthur D. Little, Incorporated, Cambridge, Mass., a corporation of Massachusetts Application June 14, 1933, Serial No. 675,744

7 Claims. (Cl. 34—24)

This invention relates to a process and apparatus for treating casings adapted to contain food products such as sausages or other materials. Such casings may be manufactured in the form of regenerated seamless cellulose hydrate tubing by an extrusion apparatus as, for example, that shown in the patent to Cohoe No. 1,163,740, dated December 14, 1915, or in the copending application Serial No. 668,714, filed May 1, 1933, and are delivered therefrom as moist collapsed tubing of any desired length. It is a well known property of cellulose hydrate that it tends, upon drying, to shrink drastically and the primary object of this invention is to control and limit positively the shrinking of the moist casing, preferably by employing a mandrel over which the moist casing is smoothly drawn, and on which the casing is dried, the amount of the shrinking of the casing incident to such drying being limited by its contact with the mandrel.

A further object of this invention resides in the employment of an expansible mandrel which is collapsed when the casing is drawn thereover, then expanded so that its external periphery is of a predetermined length to insure that the casing when dried thereon shall have an internal periphery of such length, and finally collapsed to facilitate the removal of the casing.

Other objects of the invention will appear from a consideration of the following description and of the drawing which forms a part thereof, and in which:

Fig. 1 is an elevation illustrating one form of apparatus by which this invention can be carried out;

Fig. 2 is an elevation on a larger scale of one end of the expansible mandrel on which the casing is dried; and Figs. 3 and 4 are cross sectional views of the mandrel in the expanded and contracted condition.

The drawing shows one form of apparatus by which the process feature of this invention may be carried out, but it will be understood that, while such showing embodies this invention, it is not limitative, and that other forms may be employed to carry out this process.

A casing A of any desired length after being formed on a suitable apparatus (not shown and forming no part of the present invention) is placed in a container 10. This casing is in the form of collapsed tubing, has been plasticized by treatment with glycerine, and is kept moist until the drying operation forming this invention takes place. Suitably supported in a housing 12 upon two or more rollers 14 is an expansible mandrel 16. The mandrel is constructed of any suitable material, preferably of a non-rusting character, such as stainless steel, enameled iron, or aluminum, for example. The outer surface is smooth and highly polished and preferably rounded so that it will impart a perfectly smooth inner surface to the portion of the casings contacting it.

The mandrel 16 as shown particularly in Figs. 3 and 4 comprises a pair of channelled or U-shaped members 18 and 20 of any desired length. The members 18 and 20 are connected by strips 22 preferably, though not necessarily of the same length as the members. The strips 22 are secured by bolts 24 to the side walls 26 of the member 18 and are provided with slots 28 through which pass bolts 30 projecting inwardly from the walls 32 of the member 20. The separation of the members 18 and 20, when the mandrel is expanded, is thus limited by the engagement of the bolts 30 with the bottoms of the slots 28. As shown in the drawing, the position of the bolts 24 in the member 18 may be adjusted to regulate and control the extent of the expansion of the mandrel.

The mandrel 16 is expanded by means of an air bag 34 inserted in the interior of the mandrel and terminating in a valve stem 36 which projects from the outer end of the mandrel and through which air may be introduced by a pump or other suitable means. When the bag 34 is deflated the member 18 will move toward the member 20 under the action of the force of gravity, thus releasing the casing so that it may be drawn off the mandrel. The members 18 and 20 are provided with longitudinally extending bosses 38 on which the casing A rests as shown in Fig. 3. At the outer end of the mandrel are provided rollers 40, 42, which coact with suitably supported rollers 44, 46 to guide the casing as it is removed from the collapsed mandrel. The rollers 44, 46 may be fixed in position and the mandrel being supported upon the rollers 14 shifted longitudinally to avoid contact between the rollers 40 and 42 when the mandrel is expanded. The upper roller 44 may however be mounted in a floating bearing so that it can rise or fall as the mandrel is expanded or contracted.

In carrying out this invention the leading end of the moist casing in the receptacle 10, which is in the form of a flattened tube, is opened in any suitable way as manually or by the employment of a jet of air, slipped over the inner end of the mandrel 16 which has of course been previously collapsed, and then drawn smoothly along the mandrel until it reaches the outer end. The casing is usually much longer than the portion drawn over the mandrel. That portion is not however severed from the remainder until, as pointed out below, the drying operation is completed. The housing 12 is so formed that access can be had to the mandrel by providing either a removable cover or removable wall. The housing is then closed and the mandrel expanded to the limit set by the coacting slots 28 and bolts 30. The moist casing may be larger than the mandrel when in expanded condition or it may be smaller in which case it is stretched while moist by the expansion of the mandrel. Air at a definite temperature and of a definite condition of humidity is then supplied to and circulated through the housing until the casing has dried. As pointed out above, the regenerated cellulose hydrate of which the casing A is composed, tends to shrink drastically as it dries and thus the casing is drawn taut about the mandrel (see Fig. 3), so that the inner periphery of the casing is the same as the outer periphery of the mandrel. The bosses 38 reduce the surface area of the mandrel contacted by the casing and also facilitate the drawing of the moist casing over the mandrel.

When the portion of the casing in the housing has dried about the mandrel, the mandrel is collapsed and the dried portion drawn off over the outer end. The rollers 40, 42, 44 and 46 coact to facilitate this movement of the casing. As the dried portion is removed the following moist portion of the remainder of the casing is at the same time drawn over the mandrel. When fully removed the dry portion is severed, the mandrel expanded and the operation just described is repeated until all the casing in the receptacle has been treated.

The mandrel may be of any desired length, depending upon various conditions that may exist. A mandrel of from 20 to 25 feet in length has been found to be quite satisfactory. Should it be desired to dry the casing in other than the rectangular cross section shown other forms of mandrels may be employed. While the housing is shown to be provided with a single mandrel, it will be understood that a plurality of mandrels may be employed. The rollers 14 are preferably of soft rubber so that they will not damage the casing. Suitable means (not shown) may if desired be provided by which the rollers and mandrel are separated leaving the mandrel supported at the ends only during the drying stage so that the entire length of the casing portion will dry uniformly.

The broad invention resides in the drying of a casing of indefinite length upon a mandrel over which it is drawn in a moist condition. While one form of apparatus for practicing this invention and one order of process steps have been described it will be understood that I am not limited thereto and that other forms of apparatus and other orders of process steps may be employed without departing from the spirit and scope of this invention as set forth in the following claims.

I claim:

1. The process of drying moist tubular casings made of regenerated cellulose hydrate upon an expansible mandrel, said casings being in the form of collapsed tubing, indeterminate in length, comprising the steps of opening one end of the casing, slipping said opened end over one end of the mandrel in the contracted condition, drawing the casing smoothly over the mandrel to the other end thereof, expanding said mandrel to a definite extent, permitting the portion of the casing surrounding the mandrel to dry thereon in close contact therewith, contracting the mandrel, and drawing the dried portion of the casing off the mandrel.

2. The process of drying moist tubular casings made of regenerated cellulose hydrate upon an expansible mandrel, said casings being in the form of collapsed tubing indefinite in length, comprising the steps of drawing a portion of said casing smoothly over the mandrel from one end thereof in the contracted condition, expanding said mandrel to a definite extent, permitting the casing to remain upon the mandrel until it has dried in close contact therewith, contracting the mandrel, and drawing the dried portion of the casing off the mandrel.

3. Means for drying a sausage casing comprising a housing and an expansible mandrel within the housing over which mandrel the casing is drawn and on which it is allowed to dry, said mandrel being hollow and including two relatively movable U-shaped members and an air bag within the mandrel which when inflated separates the members.

4. The process of drying moist tubular casings of regenerated cellulose hydrate in the form of seamless tubing of indeterminate length upon a mandrel comprising the steps of drawing one end of the casing smoothly over the mandrel, supporting the casing in predetermined locations on the mandrel, leaving the intervening casing portions unsupported, and permitting the casing to dry in close contact with the mandrel.

5. Means for drying a sausage casing in the form of a hollow, expansible mandrel over which the casing is drawn for drying thereon, said mandrel comprising a pair of substantially telescopically arranged members, and a bag between the members adapted to be inflated to separate the members.

6. Means for drying a sausage casing in the form of a hollow, expansible mandrel over which the casing is drawn for drying thereon, said mandrel comprising a pair of relatively movable members, each of which is provided with one or more ridge-like projections along the length thereof, and a bag between the members adapted to be inflated to separate the members, the casing being supported on the projections during drying.

7. Means for drying a sausage casing in the form of a hollow, expansible mandrel over which the casing is drawn for drying thereon, said mandrel comprising a pair of relatively movable, channel members positioned with their side flanges extending toward each other, each of the members having a ridge-like projection along the length of each corner thereof, the projections being inclined to the base and flanges of the associated member, and a bag between the members adapted to be inflated to separate the members, the casing being supported on the projections during drying.

RALPH L. ATKINSON.